United States Patent [19]
Tsai

[11] Patent Number: 6,157,467
[45] Date of Patent: Dec. 5, 2000

[54] CCD ROTARY-ALIGNMENT DEVICE FOR OPTICAL SCANNER

[75] Inventor: Jenn Tsair Tsai, Pa-Li, Taiwan

[73] Assignee: Mustek System Inc., Hsinchu, Taiwan

[21] Appl. No.: 09/100,841

[22] Filed: Jun. 19, 1998

[51] Int. Cl.$^7$ ...................................................... H04N 1/04
[52] U.S. Cl. ............................ 358/483; 358/494; 358/400
[58] Field of Search ...................................... 358/483, 406, 358/400, 474, 471, 482, 504, 505; 250/208.1; 348/294, 207, 190

[56] References Cited

U.S. PATENT DOCUMENTS 5,933,248  8/1999  Hirata ........................................ 358/406

*Primary Examiner*—Cheukfan Lee
*Attorney, Agent, or Firm*—W. Wayne Liauh

[57] ABSTRACT

A device for holding a Charge Couple Device (CCD) in an optical scanner where optical alignment of the CCD to the position of scanned image of document can be easily made. The device includes a holder for holding a lens and providing a focused image taken from the scanned document; a positioning element mounted on the holder for adapting a CCD to be slightly rotated in a plane around a pivot point fixed on the holder and aligned with the focused image. The positioning element is furnished with a matching hole for precisely carrying a bottom portion of the CCD. The positioning element mounting to the holder needs only one dimensional adjustment which is easier and more effective.

5 Claims, 7 Drawing Sheets

CCD ROTARY-ALIGNMENT DEVICE FOR OPTICAL SCANNER

BACKGROUND OF THE INVENTION

1. Field of the Invention

The present invention relates to a positioning element for holding a Charge Couple Device (CCD) in an optical scanner where optical alignment of the CCD to the position of document image can be easily made.

2. Description of Related Art

In an optical scanner, the image of a scanned document is reflected by some mirrors, focused by a lens, and imaged on a CCD, and then transformed into digital signals for processing by computers. In recent manufacturing processes, the assembly of the lens and CCD has been incorporated into a module in which the lens and the CCD have to be adjusted and aligned into suitable optical positions in order to take a sharp image from the document.

Two alignment methods of prior arts are as follows:

1) Electronic Method

As shown in FIG. 1A, an aligning arrangement for an optical scanner includes a sample scale 10, a light source 12, four reflection mirrors 14, a lens 16, and a CCD 18 mounted on a printed circuit board 24. The arrangement corrects the alignment by checking the electronic wave of scanning signals being transformed from the image of the scale 10 by the CCD 18, and adjusting the position of the CCD 18 relative to the lens 16. In this way, the sample scale 10 is fixed, and the CCD 18 is to be adjusted.

2) Optical Method

As shown in FIG. 1B, an alignment arrangement for an optical scanner includes the same components of FIG. 1A: a sample scale 10, a light source 12, four reflection mirrors 14, a lens 16, and a CCD 18 mounted on a printed circuit board 24. The module of lens 16 and CCD 18 first settled by using an optical instrument, such as a microscope, to adjust the position of the CCD 18 relative to the lens 16 for a correct focusing. In this way, the CCD 18 and the lens 16 are off-line adjusted.

No matter what method is utilized, the positioning of the CCD 18 has to be taken care in three degrees of freedom as illustrated in FIG. 2.

FIG. 2 shows a composition of a conventional lens and CCD module and its alignment requirement. Firstly, a lens 16 mounted in a holder 20 on an axes 22 is adjustable by using a driver 23 to move inward or outwards for focusing on a CCD 18. Since the CCD 18 has been soldered on a PCB (Printed Circuit Board) 24, we have to adjust the PCB 24 in movements of X-direction, Z-direction, and Y-rotation as illustrated in order to align a scanned image on the optoelectronic elements 47 before fastening the PCB 24 to the holder 20 with two screws 28 movable in two slots 26. Because the adjustment has to be done in aforesaid three degrees of freedom, and it is complicated, time consuming, and eventually difficult to achieve a reliable alignment.

SUMMARY OF THE INVENTION

It is therefore a primary objective of the present invention to solve the problems of CCD alignment encountered in prior arts and provide a new simplified device.

The present invention discloses a positioning element that holds a CCD in a manner of accurately positioning the optoelectronic elements of the CCD relative to the positioning element which mounts to a holder that incorporates the lens and the CCD. The positioning element mounted to the holder only needs one-dimensional adjustment in rotation which is easier and more effective.

BRIEF DESCRIPTION OF THE DRAWINGS

The other objectives and features of the present invention will become apparent from the following description of preferred embodiments with reference to the accompanying drawings.

DETAILED DESCRIPTION OF THE INVENTION

Figure 1A:
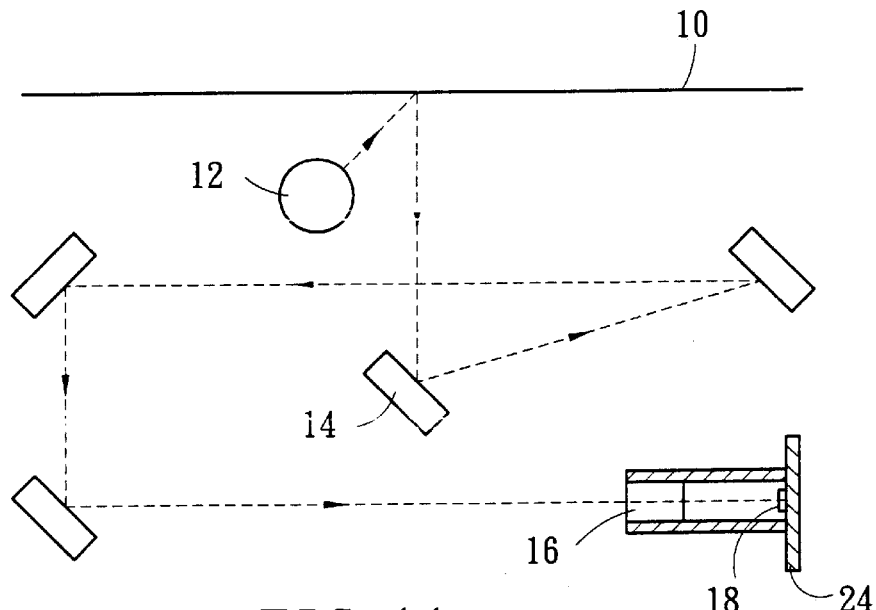
FIG. 1A is a prior art schematic view showing an alignment arrangement for an optical scanner in which an electronic method is used.
Figure 1B:
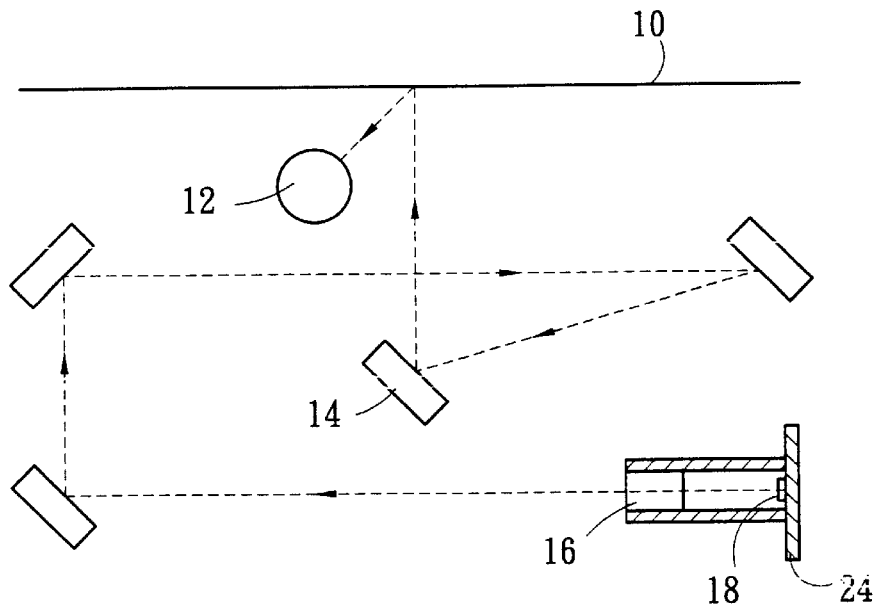
FIG. 1B is a prior art schematic view showing an alignment arrangement for an optical scanner in which an optical method is used.
Figure 2:
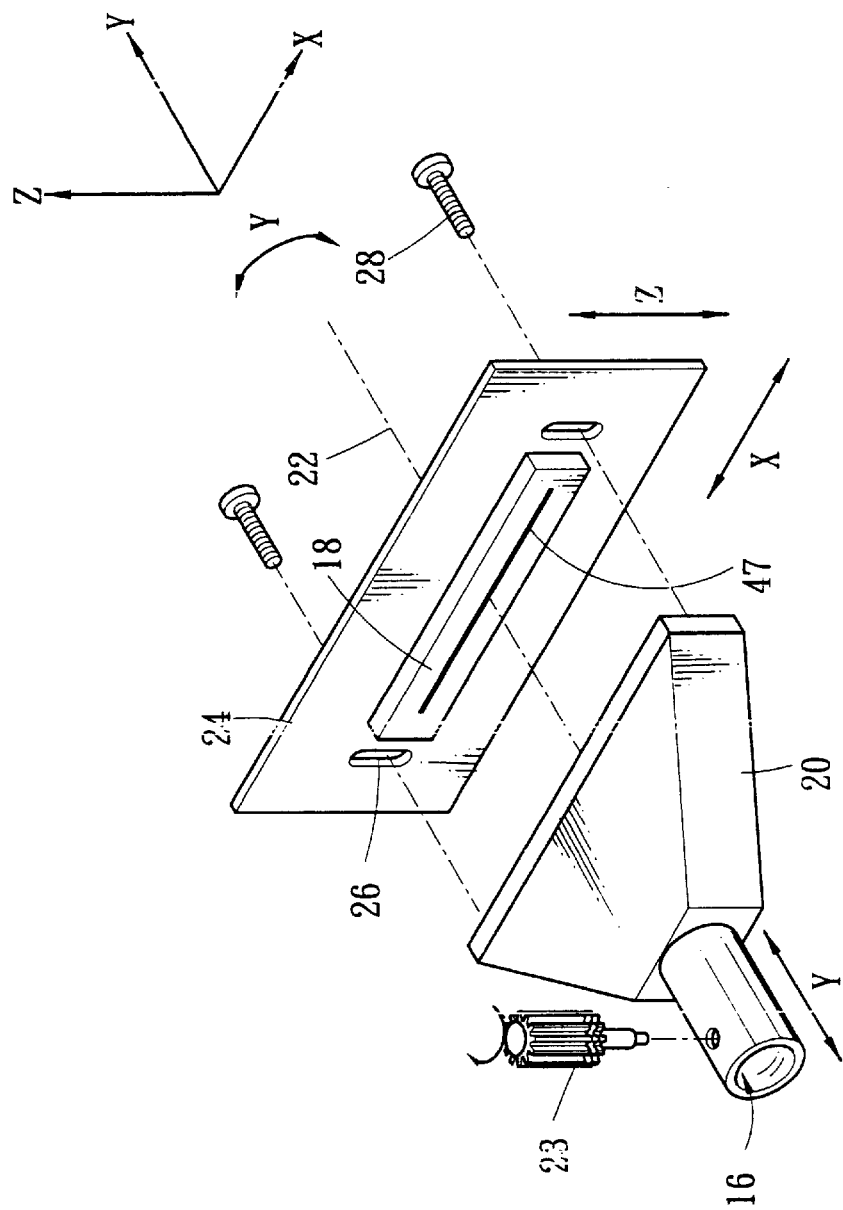
FIG. 2 is an exploded view showing the composition of a conventional lens and CCD module, and the alignment requirement thereof.

As in the above description, FIGS. 1A, 1B, and FIG. 2 illustrate alignment methods for optical scanner of prior arts.

Figure 3A:
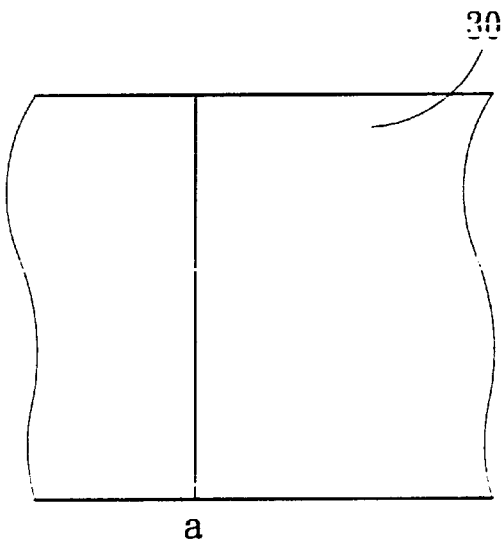
FIGS. 3A, 3B, and 3C illustrate respectively a document to be scanned, a composition of a scanner, and the scanned image.
Figure 3B:
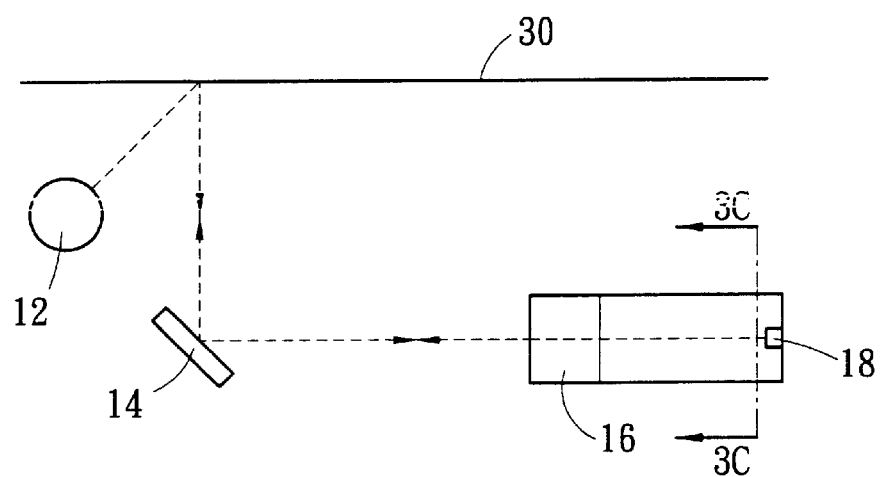
Figure 3C:
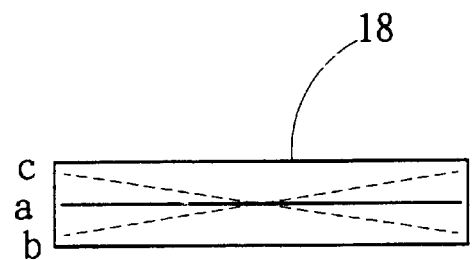

Further referring to FIGS. 3A, 3B, and 3C, a document 30 is scanned by a scanner which includes a light source 12, at least one reflection mirror 14, a lens 16, and a CCD 18. If all the optical elements align well, the scanned image of an original line "a" focused by the lens 16 and projected on the CCD 18 is shown in FIG. 3C as image "a" or, under misalignment, a bias image "b" or "c". So the scanner elements, i.e. the reflection mirror 14, the lens 16, and the CCD 18, have to be aligned or adjusted. Especially, the CCD 18 has to be aligned to the focused image "a", "b" or "c".

As described in FIG. 2 of prior arts, since the CCD 18 has been soldered on a PCB 24 without any alignment constraint during the soldering process, we have to adjust the PCB 24 in movements of three degrees of freedom in order to achieve image alignment of the CCD. Because the adjustment of aforesaid three degrees of freedom is complicated, time consuming, and eventually difficult, the present invention intends to simplify the alignment process by controlling the mounting position of the CCD relative to the lens.

The present invention discloses a positioning element that holds a CCD in a manner of accurately positioning the optoelectronic elements of the CCD relative to the positioning element which mounts to a holder that incorporates the lens and the CCD. The positioning element mounted to the holder needs one-dimensional adjustment in rotation which is easier and more effective.

Figure 4A:
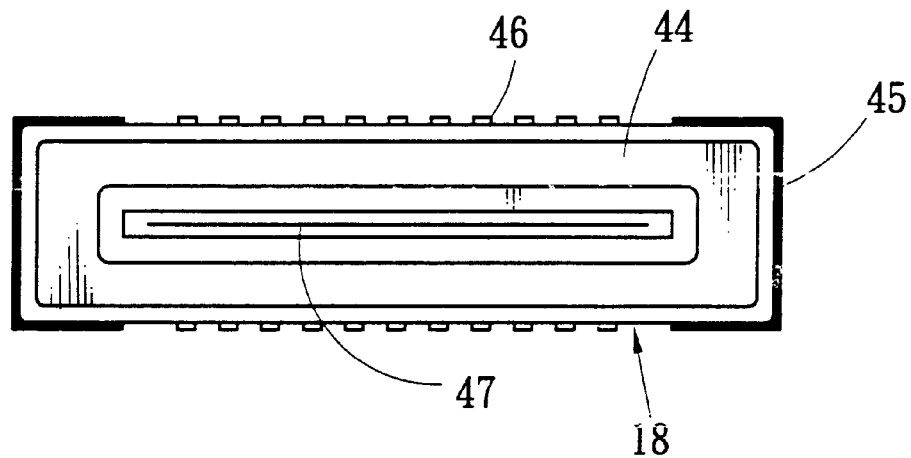
FIGS. 4A, 4B, and 4C illustrate respectively the top view, front view, and side view of a packaged CCD of prior arts.
Figure 4B:
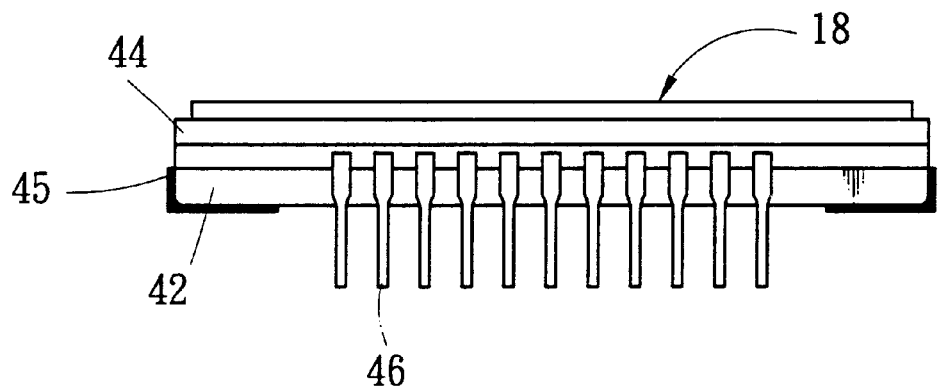
Figure 4C:
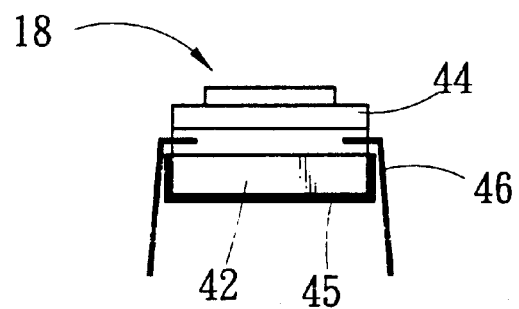

Referring to FIGS. 4A, 4B, and 4C, it is shown the top view, the front view, and the side view of a packaged CCD 18 of prior arts. During the packaging process, the bottom portion 42 of the package is based on the pins 46, i.e. the optoelectronic element 47 of the CCD 18, and the variance of configuration is generally only between 0.3 mm (the variance of the top portion 44 is larger than that.). So it is possible to use the boundary 45 of the bottom portion 42 as a positioning base when mounting the CCD 18 to a PCB or a positioning element.

Figure 5A:
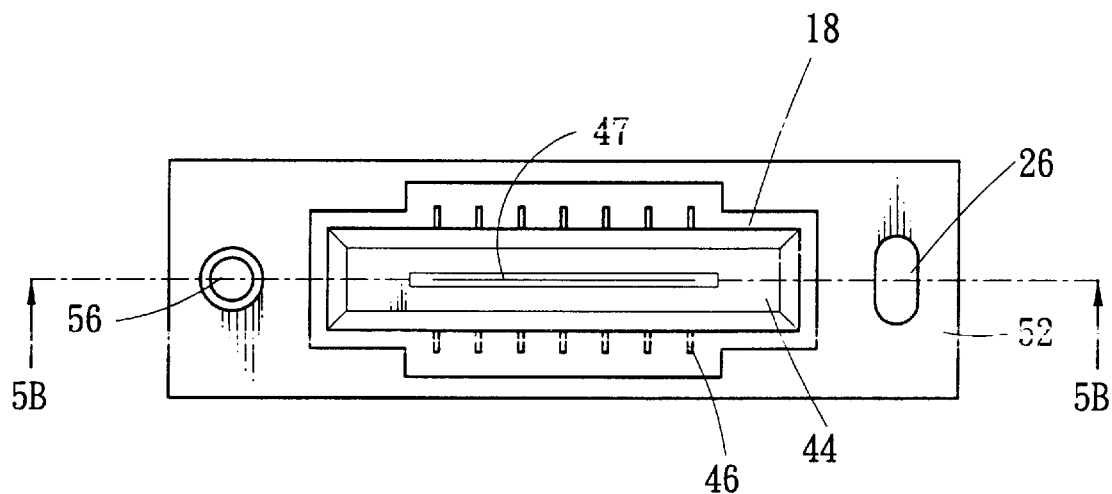
FIGS. 5A and 5B illustrate respectively the top view and sectional front view of a positioning element for CCD according to the present invention.
Figure 5B:
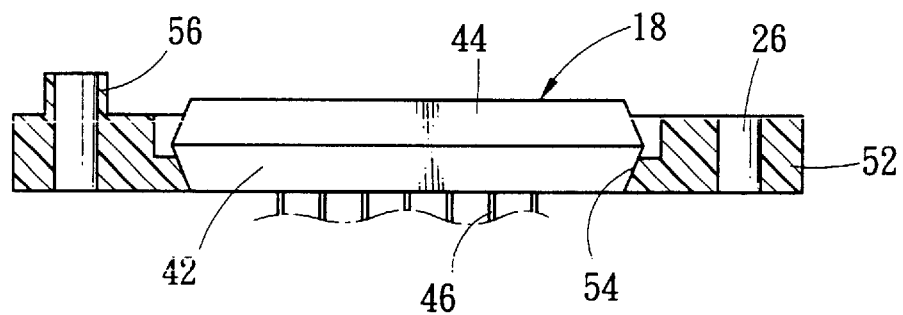

Now referring to FIGS. 5A and 5B, it is shown the top view and the sectional front view of a positioning element for CCD according to the present invention. The positioning element 52 is made of plastics or other insulating materials. A matching hole 54 furnished on the element 52 for carrying the bottom portion 42 of a CCD 18 makes the optoelectronic element 47 of the CCD precisely aligned with the positioning element 52. A boss 56 and a slot 26 relative to the boss are also furnished on two ends of the element 52 along the longitudinal direction of the optoelectronic element 47. The function of the positioning element 52 will be described below.

Figure 6A:
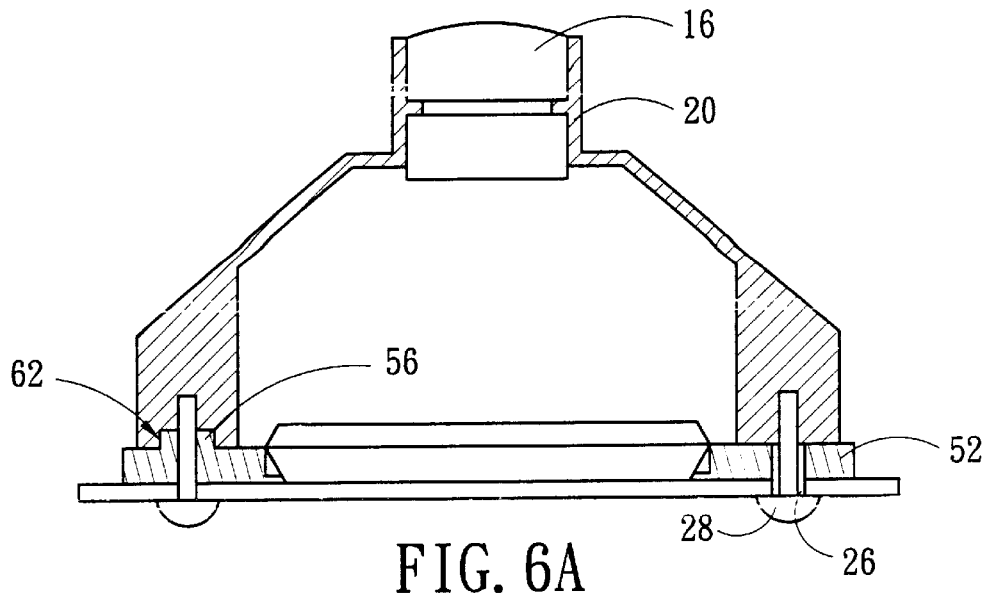
FIGS. 6A, 6B, and 6C illustrate respectively a sectional top view, side view, and a based position of a positioning element fastened to a CCD and a lens holder.
Figure 6B:
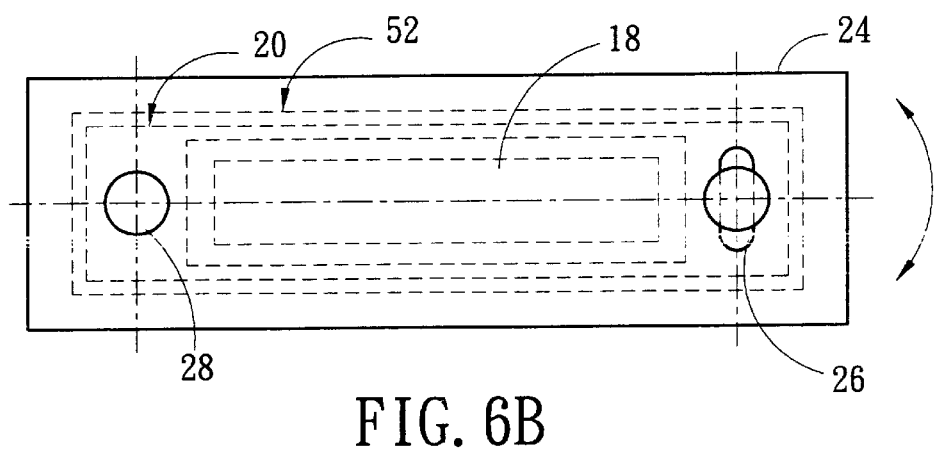
Figure 6C:
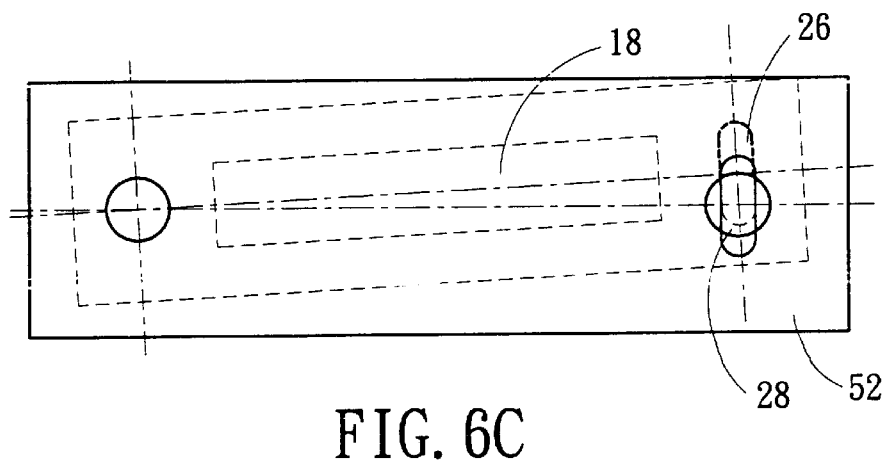

Referring now to FIGS. 6A and 6B, it is shown a sectional top view and a front view of a positioning element for a CCD 18 fastened to a CCD and a lens holder 20. The holder 20 is a closed member that incorporates a lens 16 at an opening and a CCD 18 at another opening facing to the lens 18. The CCD 18 is soldered on a PCB 24 to be fastened to the holder 20 by some fastening means such as screws 28. A positioning element 52 laid between PCB 24 and the holder 20 firmly holds the CCD 18 in a relative accurate position as described in FIGS. 5A and 5B. The CCD 18 and the positioning element 52 can be bonded together. A boss 56 furnished on the positioning element 52 can pivot on the holder 20 for rotating the CCD 18 to an angle where the correct scanned image can be detected. A curvy slot 26 relative to the boss 56 is also furnished on both the positioning element 52 and the PCB 24 for the alignment purpose before fastening them to the holder 20. FIG. 6C shows a possible condition in which the positioning element 52 and the CCD 18 are based to the PCB 24 due to the variance of soldering process and will be corrected in the alignment process. Actually, the positions of the boss 56 and the slots 26 are not limited to the ones as shown in the drawings. They can be furnished elsewhere just for the purpose of rotating the CCD 18 to meet the scanned image and fastening the CCD after alignment.

Figure 7:
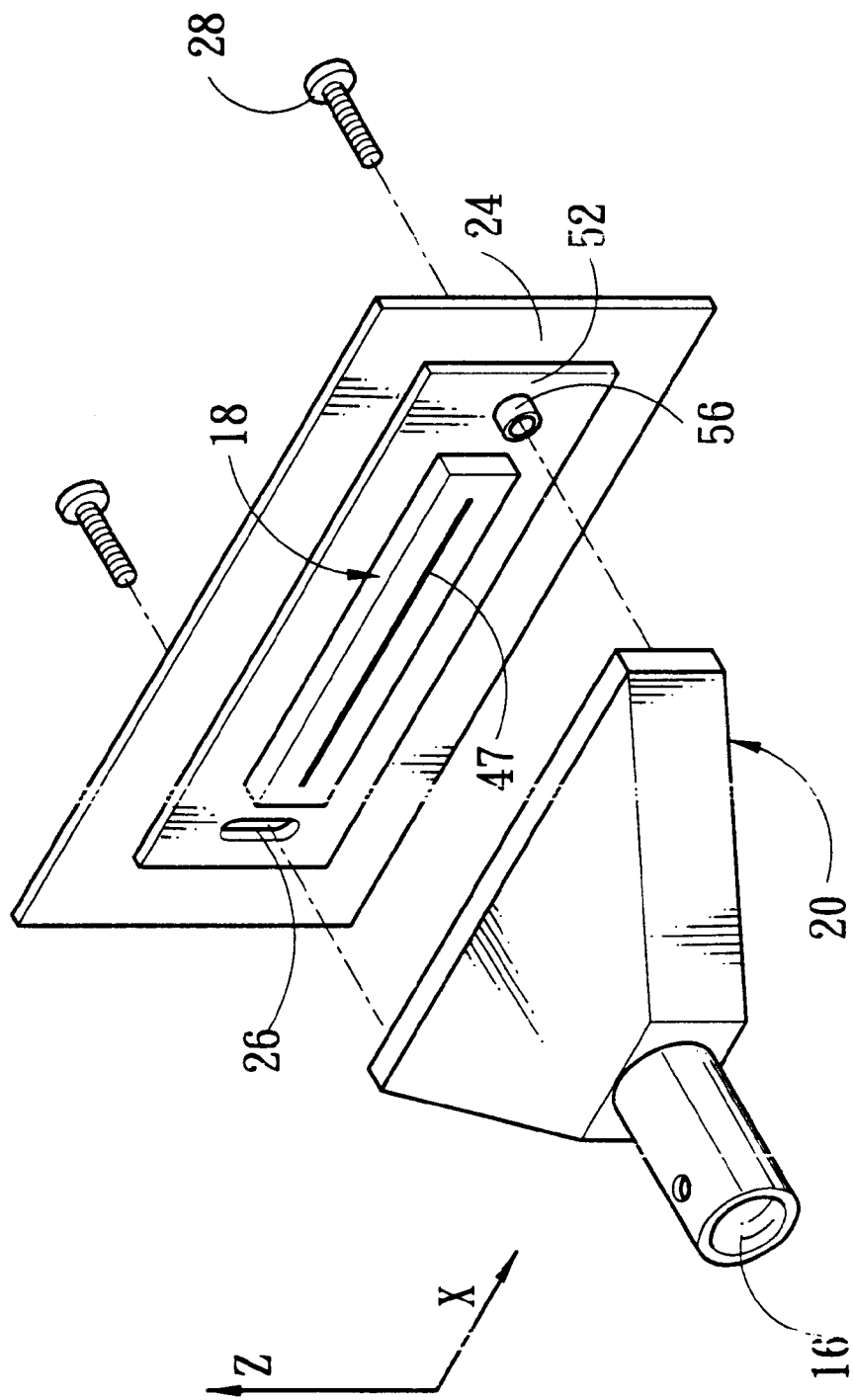
FIG. 7 is an exploded view showing a positioning element for CCD fastened to a lens and a CCD holder according to the present invention.

FIG. 7 is an exploded view showing a positioning element 52 for CCD 18 fastened to a lens and a CCD holder 20 as described in FIGS. 6A, 6B, and 6C.

It is apparent to those skilled in the art that various changes may be made without departing from the scope of the invention disclosed.

What is claimed is:

1. A device for aligning a Charge Couple Device (CCD) to a scanned image position in an optical scanner, comprising:

a holder for holding a lens and a CCD, and producing a focused image taken from a scanned document on said CCD, said holder having a bottom plan;

a bottom portion affixed to said CCD, said bottom portion having truncated edges such that its width decreases linearly with distance from said CCD;

a positioning element affixed to said holder;

an opening formed in said positioning element for receiving said bottom portion, said opening having matching truncated edges so as to allow said bottom portion to be received therein without clearance therebetween and restrict movements of said CCD; and pivotal adjustment means provided with said positioning element to allow for pivotal adjustment along said bottom plan of said holder and about a pivot point fixed on said holder before said positioning element is fixed to said holder.

2. A device according to claim 1 wherein said CCD is soldered on a printed circuit board and said positioning element is held between said printed circuit board and said holder for fixing said CCD.

3. A device according to claim 2 wherein said positioning element is furnished with a boss and a slot located apart along a longitudinal direction of said positioning element for pivoting on said holder via said boss, rotating for CCD alignment, and fixing said printed circuit board, and said positioning element and said holder fasten respectively through said boss and said slot by two screws.

4. A device according to claim 1 wherein said CCD is bonded to said matching hole of said positioning element.

5. A device according to claim 1 wherein said pivotal adjustment means comprises a boss at a first end of said positioning element and a groove at a second end, wherein said groove is longer and wider than what is necessary to receive a screw so as to allow said second end of said positioning element to pivot about said first end.

* * * * *